United States Patent [19]
Sakakibara et al.

[11] Patent Number: 5,985,957
[45] Date of Patent: Nov. 16, 1999

[54] METHOD OF CORROSION PREVENTION AND CORROSION PREVENTIVE MATERIAL SUITABLE FOR USE THEREIN

[75] Inventors: Kazutoshi Sakakibara; Minoru Kaneko, both of Aichi; Kazumasa Asano, Ibaraki, all of Japan

[73] Assignees: Togo Seisakusyo Corporation, Aichi-ken; Nitto Denko Corporation, Osaka, both of Japan

[21] Appl. No.: 08/791,943

[22] Filed: Jan. 31, 1997

[30] Foreign Application Priority Data

Jul. 19, 1996 [JP] Japan .................................. 8-190941
Sep. 24, 1996 [JP] Japan .................................. 8-251040

[51] Int. Cl.$^6$ .............................. C08K 5/00; C09K 3/00; C04B 9/02
[52] U.S. Cl. ................. 523/459; 252/389.52; 106/14.05; 428/328; 524/439
[58] Field of Search ................... 428/328, 334, 428/335, 421, 425.6, 433, 443, 446, 451, 471, 480, 493, 494, 521; 427/407.3, 410; 106/14.05; 252/389.52; 523/459; 524/439

[56] References Cited

U.S. PATENT DOCUMENTS 4,572,868 2/1986 Hosaka et al. ......................... 428/328
4,728,544 3/1988 Asoshina et al. .................... 427/407.3

FOREIGN PATENT DOCUMENTS 2-294370 12/1990 Japan .
6-305329 11/1994 Japan .

Primary Examiner—Ponnathapura Achutamurthy
Assistant Examiner—P. Ponnaluri
Attorney, Agent, or Firm—Wenderoth, Lind & Ponack L.L.P.

[57] ABSTRACT

A corrosion preventive material contains zinc and is applied to the surface of a metal product for preventing corrosion of the product. The material consists essentially of a base material of synthetic resin and 65% or more zinc powder by weight dispersed in the base material, the zinc powder containing 25% or more zinc powder by weight having a grain diameter of or above 150 $\mu$m. Alternatively, the corrosion preventive material consists essentially of a base material of synthetic resin and 45% or more zinc powder by weight dispersed in the base material, the zinc powder containing 90% or more zinc powder by weight having a grain diameter of or above 150 $\mu$m. A method of corrosion prevention includes the steps of bonding a first metal product to a second metal product with an adhesive corrosion preventive material consisting essentially of a mixture of metal powder for sacrificial corrosion prevention which is baser in a galvanic series than the first metal product and an adhesive resin, and applying an electrodeposition coating to surfaces of the first metal product and the adhesive corrosion preventive material subsequently to the bonding step.

10 Claims, 7 Drawing Sheets

| Type of zinc grain | a | b | c | d | e | f | a |
|---|---|---|---|---|---|---|---|
| Hardening | Hardened | Hardened | Hardened | Hardened | Hardened | Hardened | Unhardened |
| Weight (%) percentage — Zinc grain | 90 | 90 | 90 | 90 | 90 | 90 | 90 |
| Weight (%) percentage — Epoxy resin | 10 | 10 | 10 | 10 | 10 | 10 | 10 |
| Volume resistivity (Ω) | 0.04 | 0.11 | 1.56 | 9.3 | 0.34 | — | $1 \times 10^7 <$ |
| Zinc content (%) — Surface | 69.1 | 57.3 | 57.3 | 77.8 | 77.6 | — | 23.0 |
| Zinc content (%) — Section | 80.6 | 80.9 | 80.3 | 91.9 | 79.6 | — | 77.0 |
| Conductivity | Yes | Yes | Yes | Yes | Yes | — | No |
| Corrosion potential (mV) | −1030 | −1015 | −1009 | −909 | −1011 | −632 | −620 |
| Corrosion preventive current (mA/cm$^2$) | 9 | 2.7 | 1.1 | 0.46 | 1.05 | −0.18 | −0.20 |
| Zinc coating coverage(%)* | 83.9 | 72.3 | 90.5 | 97.8 | 91.7 | 99.2 | — |
| Applicability to electrodeposition coating | Yes | Yes | Yes | Yes | Yes | Yes | — |

* where zinc coating coverage (%) = $\dfrac{\text{precoating surface zinc content} - \text{postcoating surface zinc coating}}{\text{precoating surface zinc content}} \times 100$

FIG. 3

| Sample | | A | B | C | D | E | F | G | H | I | J | K | L |
|---|---|---|---|---|---|---|---|---|---|---|---|---|---|
| Zinc grain diameter rate(%) | 350~150μm | 22 | 22 | 25 | 28 | 28 | 28 | 78 | 78 | 78 | 90 | 90 | 90 |
| | 150~60 | 27 | 27 | 27 | 27 | 27 | 27 | 22 | 22 | 22 | 10 | 10 | 10 |
| | 60~ | 51 | 51 | 48 | 45 | 45 | 45 | Small amount | Small amount | Small amount | Small amount | Small amount | Small amount |
| Weight (%) percentage | Zinc | 65 | 70 | 65 | 60 | 65 | 70 | 60 | 65 | 70 | 40 | 45 | 50 |
| | Epoxy resin | 35 | 30 | 35 | 40 | 35 | 30 | 40 | 35 | 30 | 60 | 55 | 50 |
| Corrosion potential (mV) | | -605 | -592 | -780 | -590 | -790 | -934 | -650 | -860 | -992 | -656 | -1000 | -1016 |
| Corrosion preventive current (mA/cm²) | | -0.19 | -0.22 | 0.009 | -0.26 | 0.01 | 0.023 | -0.023 | 0.151 | 2.2 | -0.22 | 3.5 | 12 |

FIG. 4

| Weight percentage (%) | | | | | | |
|---|---|---|---|---|---|---|
| Zinc grain (type/rate) | a / 85 | a / 85 | a / 85 | a / 85 | a / 87 | a / 90 |
|  | d / 5 | e / 5 | e / 5 | f / 5 | e / 3 | - / - |
| Epoxy resin | 10 | 10 | 10 | 10 | 10 | 10 |
| Surface zinc content (%) | 71.4 | 71.2 | 71.2 | 71.8 | 71.2 | 69.1 |
| Corrosion potential (mV) | -1020 | -1021 | -1020 | -1020 | -1018 | -1030 |
| Corrosion preventive current (mA/cm²) | 6.5 | 6.8 | 6.3 |  | 6.4 | 9 |
| Zinc coating coverage (%)* | 85.2 | 84.6 | 85.7 |  | 84.3 | 83.9 |

* where zinc coating coverage (%) =
$$\frac{\text{(precoating surface zinc content} - \text{postcoating surface zinc coating)}}{\text{precoating surface zinc content}} \times 100$$

FIG. 5

METHOD OF CORROSION PREVENTION AND CORROSION PREVENTIVE MATERIAL SUITABLE FOR USE THEREIN

BACKGROUND OF THE INVENTION

1. Field of the Invention

This invention relates to a method of corrosion prevention applied to surfaces of metals for the purpose of preventing corrosion thereof and a corrosion preventive material suitable for use in the method.

2. Description of the Prior Art

Metal products and structures are sometimes used or located under severe environmental conditions or sometimes require a long period of life. These metal products and structures include automobiles, offshore structures, bridges, pipe lines and the like. These metal products and structures have problems of deterioration in the strength and appearance due to corrosion of metals. The prior art has provided various methods of corrosion prevention for the metal products and structures. Painting is one of the most widespread methods and is applied for preventing corrosion in parts of complicated configurations used in automobiles or the like. For example, an automobile door comprises two metal panels, that is, an outer panel and an inner panel. These metal panels are bonded or otherwise, joined together into a hemming structure wherein the outer panel is hemmed or folded back in the vicinity of one end thereof and one end of the inner panel is held in a hemming portion between the outer panel and the folded portion thereof. The hemming portion of the automobile door requires a high level of corrosion resistance. Publication No.6-305329 (1994) of an unexamined Japanese patent application proposes a corrosion proof structure by painting. However, the disclosed structure is insufficient in the effect of corrosion prevention for an adhesive agent, admitting of further improvement in the corrosion proofness.

Another method utilizes sacrificial corrosion prevention and has been put to practical use. For the corrosion prevention of steel products, for example, a corrosion preventive material has been provided wherein a powdered metal which is baser in the galvanic series than iron, such as zinc, is dispersed into a resin. Publication No.2-294370 (1990) of an unexamined Japanese patent application discloses such a corrosion preventive material. As disclosed in the publication, zinc grains whose grain diameters range between 70 to 150 μm are mixed with an adhesive, solvent or filling material in a predetermined mixing ratio. The mixture is brought into contact with a steel product to be protected from corrosion so that zinc is preferentially corroded, thereby preventing corrosion of the steel product.

However, the above-described corrosion preventive material cannot obtain a sufficient effect of corrosion prevention. Furthermore, since the concentration of zinc contained in the material needs to be high, the cost of the material is increased.

SUMMARY OF THE INVENTION

Therefore, an object of the present invention is to provide a method of corrosion prevention which is low-cost and applicable to the parts of complicated configurations as the method using a paint and can attain a high level of corrosion proofness not obtained by the mere paint, and a corrosion preventive material used in the method.

To achieve the object, the present invention provides a corrosion preventive material which contains zinc and is applied to a surface of a metal product for preventing corrosion of the product. The material consists essentially of a base material of synthetic resin and 65% or more zinc powder by weight dispersed in the base material, the zinc powder containing 25% or more zinc powder by weight having a grain diameter of or above 150 μm.

The reason for the above-described composition of the corrosion preventive material is as follows. The effect of a sacrificial corrosion prevention can be learned from the magnitude of a corrosion preventive current. From Ohm's law (voltage=current×resistance), as the resistivity of a corrosion preventive material is small, the corrosion preventive current becomes larger and a higher corrosion protection effect can be obtained.

The resistivity of a material obtaining electrical conduction by dispersed grains as in the present invention is shown by the sum of grain internal resistance and contact resistance of contact portions of the grains. However, since a zinc grain has a small internal resistance, the whole resistivity actually depends upon the sum of contact resistance.

A corrosion preventive coat is formed from a corrosion preventive material consisting of a mixture of metal grains having a small grain diameter and a base material in the prior art. When a corrosion preventive coat is formed from the prior art corrosion preventive material, the grains are densely packed in the coat of a fixed thickness. Accordingly, since the number of contact portions between the grains is increased, the sum of contact resistance becomes large. More specifically, since the whole resistivity is rendered large, the corrosion preventive current becomes small, whereupon a high level of sacrificial corrosion prevention effect cannot be obtained.

In the present invention, however, 65% or more zinc powder by weight is dispersed in the base material, which zinc powder contains 25% or more zinc powder by weight having a grain diameter of or above 150 μm. In this case, the number of zinc grains arranged in the coat of a fixed thickness is reduced as compared with the case where the grains having a grain diameter smaller than in the present invention is mixed with the base material at the same concentration. Consequently, the sum of contact resistance becomes small. More specifically, since the whole resistivity is rendered sufficiently small, the corrosion preventive current is increased, whereupon a high level of sacrificial corrosion prevention effect can be obtained.

In a preferred form, the corrosion preventive material consists essentially of a base material of synthetic resin and 45% or more zinc powder by weight dispersed in the base material, the zinc powder containing 90% or more zinc powder by weight having a grain diameter of or above 150 μm. Since the proportion of the zinc grains having a large grain diameter is increased, a conducting path can be ensured and the sum of contact resistance becomes small even when the number of grains is small.

In another preferred form, the grain diameter of the zinc powder is 350 μm or below when the base material is in the form of a liquid or paste. When the grain diameter of the zinc grains exceeds 350 μm, grain spacing between zinc grains becomes so large that the base material cannot be retained in the grain spacing. As a result, the base material tends to separate from the zinc powder to be precipitated.

In further another preferred form, 3% or more zinc powder by weight containing 97% or more zinc powder by weight having a grain diameter ranging between 44 and 74 μm is dispersed in the base material of synthetic resin. The rate of zinc exposed on the surface of the corrosion preventive material is increased as compared with the case where the same concentration of zinc powder containing only large grains is used. As a result, the applicability of corrosion preventive material to the electrodeposition coating is improved such that a higher level of corrosion prevention effect can be obtained.

The present invention further provides a method of corrosion prevention which is applied to a surface of a first metal product for preventing corrosion of the product. The method comprises the steps of bonding the first metal product to a second metal product with an adhesive corrosion preventive material consisting essentially of a mixture of metal powder for sacrificial corrosion prevention which is baser in a galvanic series than the first metal product, and an adhesive resin, and applying an electrodeposition coating to surfaces of the first metal product and the adhesive corrosion preventive material subsequently to the bonding step.

The adhesive corrosion preventive material used in the method contains the adhesive resin as its base material, and accordingly, the material serves as an adhesive agent as well as the corrosion preventive material. Thus, the adhesive corrosion preventive material can conveniently be used for assembly of metal parts each having a complex structure.

Furthermore, since the adhesive corrosion preventive material has electrical conductivity, a coating film can be formed by the electrodeposition coating on the surface of the material as well as on the metal parts. Consequently, the corrosion prevention effect can further be increased.

In the above-described method, the adhesive resin is preferably a thermosetting resin and the electrodeposition coating is preferably applied to the first metal product temporarily attached to the second metal product with the adhesive corrosion preventive material so that an electrodeposited paint film is dried by heating. The thermosetting resin can be hardened by using the step of drying the electrodeposited paint film by heating. As a result, since a separate heating step is unnecessary for hardening the adhesive agent, an assembly process can be simplified.

An epoxy resin is most preferable as the above-mentioned thermosetting resin. Other preferred thermosetting resins include a silicon resin, urea resin, phenol resin, unsaturated polyester resin, melamine resin, acrylic resin, and alkyd resin. The thermosetting resin may be composed of an emulsion type polyvinyl chloride (PVC), which is heated into a three-dimensional bridge structure and then hardened. Furthermore, a complex such as a mixture of the epoxy resin and PVC may be used as the thermosetting resin.

The metal powder for the sacrificial corrosion prevention contained in the adhesive corrosion preventive material preferably has a grain diameter of or below 350 $\mu$m when the thermosetting resin is hardened by using the step of drying the electrodeposited paint film by heating. When the grain diameter exceeds 350 $\mu$m, a metal content of the paint film surface is reduced such that the surface conductivity is lowered. Consequently, the paint film is difficult to be formed even when the electrodeposition coating is carried out.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 3 show the results of measurements carried out with respect to zinc-epoxy tapes made by mixing zinc powders shown in TABLES 1A–1F and epoxy resin;

FIG. 4 shows the results of measurements carried out with respect to zinc-epoxy paste;

FIG. 5 shows the results of measurements carried out with respect to zinc-epoxy tapes each containing zinc powder with a large grain diameter and zinc powder with a small grain diameter;

DETAILED DESCRIPTION OF THE PREFERRED EMBODIMENTS

Figure 1:
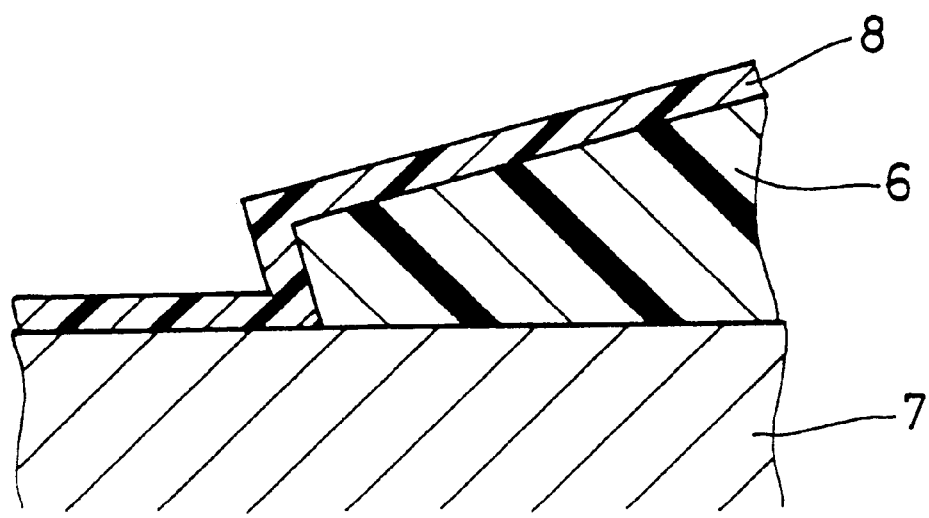
FIG. 1 is a sectional view of a steel piece and a zinc-epoxy tape to which the electrodeposition coating is applied.

Grain diameter of adhesive corrosion preventive material and processing:

TABLES 1A to 1F show zinc powders with various grain size distributions. The grain diameters in TABLES 1A–1F were measured by a roll tap type shaker. Each zinc powder and an epoxy resin were mixed in the ratio of 9:1 to fabricate a zinc-epoxy tape. For the purpose of hardening, each tape was stuck on a steel piece, and two silicon rubber blocks were clipped to both sides of the steel piece respectively. In this condition, the steel piece was heated at 170° C. for 20 minutes. The silicon rubber blocks were removed after the tape has been hardened. Two kinds of tapes were fabricated regarding the zinc powder of TABLE 1A: the epoxy resin was unhardened in one kind of tape and the epoxy resin was hardened in the other.

A volume resistivity was measured at intervals of 1 mm by a digital multimeter (DMM) for the investigation of electric conductivity of these tapes. Furthermore, a corrosion preventive current at –770 mV which is a corrosion potential of iron was measured by a constant potential analyzing regarding each tape.

Furthermore, the surface and sectional zinc contents were measured by a wavelength dispersive electron-beam microanalyzer (EPMA). The zinc content was measured at three optional points on a surface area of 20×15 mm and at three optional points on a sectional area of 20×0.5 mm. An average value was obtained for each of the surface and sectional zinc contents.

Furthermore, each tape was fixed to the steel piece by plastic bolts and then immersed in an aqueous solution of 3% sodium chloride for 30 minutes for the measurement of corrosion potential.

Each zinc-epoxy tape was bonded to a test steel piece and a cationic electrodeposition coating was then applied to the test steel piece for the examination of applicability of the zinc-epoxy tape to the electrodeposition coating. The zinc content at each test steel piece surface was measured before and after the electrodeposition coating by EPMA for the calculation of zinc coating coverage on each test steel piece. Furthermore, each test steel piece was cut after the coating and then embedded in a phenol resin for the observation of sectional state thereof by a scanning electron microscope (SEM). FIG. 3 shows the results of the above-described measurements.

TABLE 1A

| Grain diameter D of zinc powder (μm) | Rate (%) |
| --- | --- |
| 350 ≦ D | 0.3 |
| 180 ≦ D < 350 | 48.1 |
| 150 ≦ D < 180 | 29.1 |
| 106 ≦ D < 150 | 19.4 |
| 75 ≦ D < 106 | 2.3 |
| D < 75 | 0.8 |

TABLE 1B

| Grain diameter D of zinc powder (μm) | Rate (%) |
| --- | --- |
| 100 ≦ D | 5 |
| 60 ≦ D < 100 | 25 |
| 44 ≦ D < 60 | 50 |
| D < 44 | 20 |

TABLE 1C

| Grain diameter D of zinc powder (μm) | Rate (%) |
| --- | --- |
| 86 ≦ D < 106 | 5.2 |
| 74 ≦ D < 86 | 23.0 |
| 44 ≦ D < 74 | 24.3 |
| D < 44 | 47.5 |

TABLE 1D

| Grain diameter D of zinc powder (μm) | Rate (%) |
| --- | --- |
| 44 ≦ D < 74 | 99.3 |
| D < 44 | 0.7 |

TABLE 1E

| Grain diameter D of zinc powder (μm) | Rate (%) |
| --- | --- |
| 44 ≦ D < 74 | 97.0 |
| D < 44 | 3.0 |

TABLE 1F

| Grain diameter D of zinc powder (μm) | Rate (%) |
| --- | --- |
| D < 44 | 100.0 |

FIG. 3 shows the characteristics of tapes using the zinc powders shown in TABLE 1A both before and after hardening. FIG. 3 shows that the tape with unhardened epoxy resin has a high volume resistivity and a low zinc percentage content. However, when the epoxy tape is hardened, the volume resistivity is reduced, whereas the zinc percentage content is increased.

The tape containing unhardened epoxy resin has a corrosion potential higher than that of iron, −770 mV. This tape cannot be used for the sacrificial corrosion prevention. However, the tape containing hardened epoxy resin has a corrosion potential of −1030 mV which is lower by 260 mV than the corrosion potential of iron. The tape also has a corrosion preventive current of 9 mA/cm$^2$, which shows a high sacrificial corrosion prevention effect.

The above-described results will be explained by the following mechanism. The epoxy resin is, when hardened, shrunk such that sporadic zinc grains come close to each other, whereupon the zinc concentration is increased. Consequently, a conduction path is ensured such that a stable conductivity is obtained. Furthermore, since the percentage of zinc exposed at the tape surface is increased, a high sacrificial corrosion prevention effect is obtained. The surface zinc percentage content is varied before and after hardening of the epoxy resin more than the sectional zinc percentage content. This is because the shrinkage rate of epoxy resin is higher at the surface and its vicinity than inside the tape.

The case where the electrodeposition coating was applied to the tape containing unhardened epoxy resin will be explained as follows. Electrodeposited paint films are formed only on surface portions at which zinc is exposed. The epoxy resin is shrunk when the tape was dried by heating. Consequently, the shrinkage of epoxy resin causes the paint films to come closer to each other such that the entire surface is covered by the paint film. This can be confirmed when the section of the zinc-epoxy tape to which the electrodeposition coating has been applied and which has been hardened is observed. A paint film 8 is formed on an entire zinc-epoxy tape 6 as well as on a steel 7.

Figure 2:
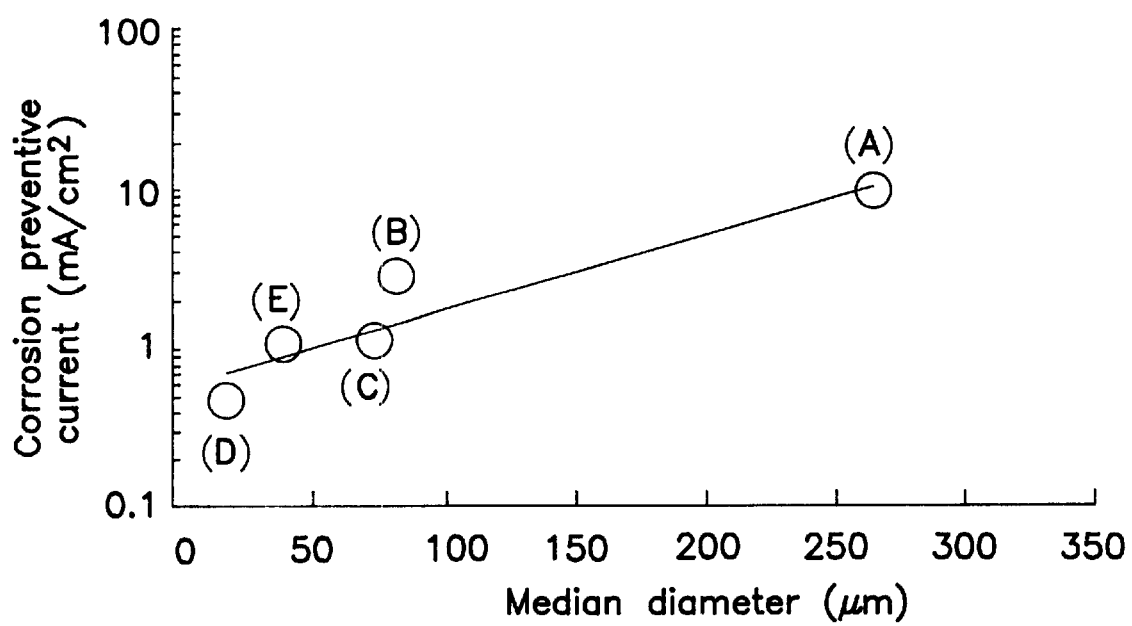
FIG. 2 is a graph showing the relationship between median diameter and corrosion preventive current.

The zinc-epoxy tapes will further be compared by the grain size distributions of mixed zinc powder. As shown in FIG. 3, each case shows a high surface zinc content and a satisfactory conductivity although the measured values differs a little from one another. Furthermore, each case shows a corrosion potential sufficiently lower than that of iron, −770 mV. The zinc-epoxy tape containing the mixed zinc powder having a large grain diameter as shown in TABLE 1A has the lowest corrosion potential and the largest corrosion prevention current. For an easier understanding of these results, FIG. 2 shows the relationship between a median diameter of the zinc powder and the corrosion preventive current indexing the corrosion prevention effect. FIG. 2 shows that as the median diameter, that is, the grain diameter increases, the corrosion preventive current becomes larger and a higher sacrificial corrosion prevention effect is obtained. It is supposed that the number of contacts between the zinc grains in the base material becomes smaller as the grain diameter is large and that the whole resistivity is reduced with a decrease in the contact resistance such that a large corrosion preventive current is obtained.

Furthermore, the coating coverage as the result of the electrodeposition coating is higher in the cases where the grain diameter is small (TABLES 1C, 1D and 1E). However, the coverage is sufficient for the applicability to the electrodeposition coating in the cases where the grain diameter is large.

Thus, a corrosion preventive material with a higher corrosion prevention effect can be obtained when the zinc powder containing a large number of grains with a large grain diameter is mixed into the epoxy resin serving as the base material than in the case where the zinc powder containing a large number of grains with a small grain diameter is mixed into the epoxy resin in the same concentration.

Weight percentage of zinc:

Zinc powders as shown in FIG. 4 were mixed into the epoxy resin in the shown weight percentages so that various zinc-epoxy pastes were made. Each zinc-epoxy paste with a thickness of 0.5 mm was sandwiched between two steel pieces to be made into a test piece. Each test piece was immersed in an aqueous solution of 3% sodium chloride for 30 minutes for the measurement of both corrosion potential and corrosion preventive current at the corrosion potential of iron, −770 mV, by the constant potential analyzing. FIG. 4 shows the results of the measurement.

As obvious from FIG. 4, the corrosion preventive current is not always large when the weight percentage of zinc is higher in the cases where the zinc powder whose grain diameter ranges from 150 to 350 $\mu$m is less than 25% by weight. The reason for this would be that since the sum of contact resistance of the grains is increased even when the weight percentage of zinc is high, the corrosion preventive current consequently becomes small.

In the test pieces containing 25% or more zinc powder with the grain diameter ranging from 150 to 350 $\mu$m, by weight, the corrosion preventive current becomes larger as the weight percentage of zinc is high. An increase in the grains with a large grain diameter reduces the number of contacts between the adjacent grains, so that the sum of contact resistance is reduced. As a result, the concentration of zinc is reflected directly on the corrosion preventive current.

Furthermore, no corrosion prevention effect is obtained when the zinc weight percentage is 60% in the base material in the cases where the concentration of zinc powder with the grain diameter ranging from 150 to 350 $\mu$m is more than 25% and less than 90% (samples C to I). Accordingly, the weight percentage of zinc needs to be 65% or more. A satisfactory sacrificial corrosion prevention effect is obtained when the zinc weight percentage in the base material is 45% or more in the cases where the concentration of zinc powder with the grain diameter ranging from 150 to 350 $\mu$m is 90% or more (samples J to L).

As the result of the above-described experiment, a satisfactory corrosion prevention effect is obtained when 65% or more zinc powder containing 25% or more zinc powder having a grain diameter ranging from 150 to 350 $\mu$m is mixed into the base material, by weight or when 45% or more zinc powder containing 90% or more zinc powder having the same grain diameter range is mixed into the base material, by weight. A desired corrosion preventive material can be obtained in view of its operability and corrosion prevention effect on the basis of the above-described experimental results.

Zinc-epoxy tape made by mixing zinc powders with small and large grain diameters:

The zinc powder with a large grain diameter shown in TABLE 1A and the zinc powder with a small grain diameter shown in TABLES 1D to 1F were mixed together at the shown rate into 90%-zinc-epoxy tapes.

Each tape was immersed in an aqueous solution of 3% sodium chloride for 30 minutes for the measurement of corrosion potential and corrosion preventive current at the corrosion potential of iron, that is, −770 mV, by the constant potential analyzing.

Furthermore, the surface zinc content was measured by the wavelength dispersive electron-beam microanalyzer (EPMA). The zinc content was measured at three optional points on a surface area of 20×15 mm and an average value was obtained.

Furthermore, the cationic electrodeposition coating was applied to each tape for the examination of applicability of each zinc-epoxy tape to the electrodeposition coating. The surface zinc content was measured after the electrodeposition coating by EPMA for the calculation of zinc coating coverage on each tape.

As obvious from FIG. 5, each tape has a sufficiently lower corrosion potential than that of iron, −770 mV and a large corrosion preventive current. Furthermore, both of the surface zinc content and the zinc coating coverage are higher in each tape as compared with the case where zinc contains grains with a large grain diameter under the condition of the same weight percentage and concentration. It is supposed that the mixture of the grains with a large grain diameter and those with a small grain diameter improves the dispersibility of zinc grains, whereupon the sacrificial corrosion prevention effect of the zinc-epoxy tape is further improved.

First Embodiment

A first embodiment of the present invention will now be described with reference to FIGS. 6 to 9. In the embodiment, the corrosion preventive tape of the present invention is applied to an automobile door which comprises two steel panels, that is, an outer panel 10 and an inner panel 11 joined together into the hemming structure.

Figure 6:
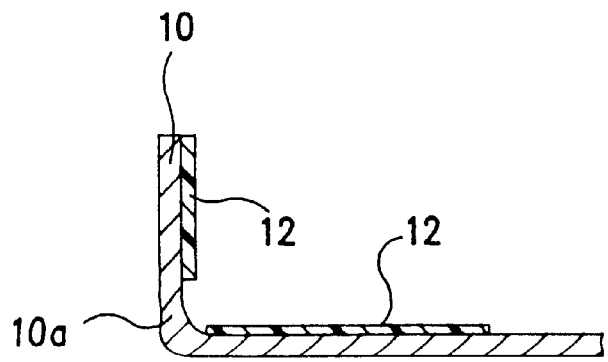
FIG. 6 is a sectional view of the hemming portion in an assembly process, to which portion the corrosion preventive tape of a first embodiment in accordance with the present invention is applied.

Referring to FIG. 6, the outer panel 10 is bent at a right angle in the vicinity of its one end. Two cut pieces of an adhesive corrosion preventive tape 12 of the embodiment are applied to the inner surface at both sides of a bent corner 10a respectively. With respect to the adhesive corrosion preventive tape 12, the zinc powder shown in TABLE 1A is mixed with the thermosetting epoxy resin so as to have a 90% concentration and the mixture is then formed into a tape.

Figure 7:
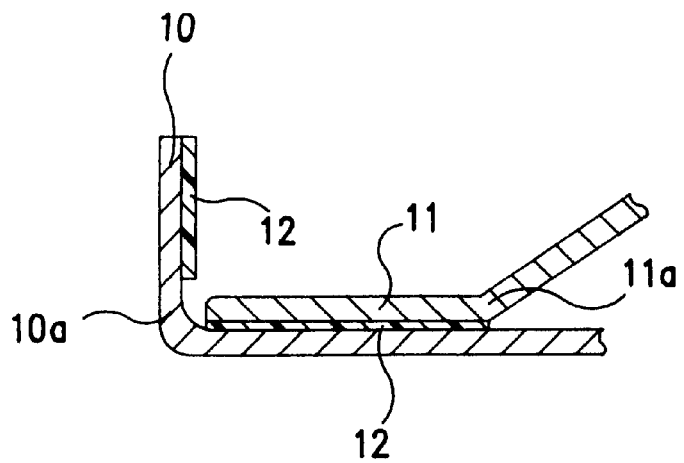
FIG. 7 is also a sectional view of the hemming portion in the assembly process.
Figure 8:
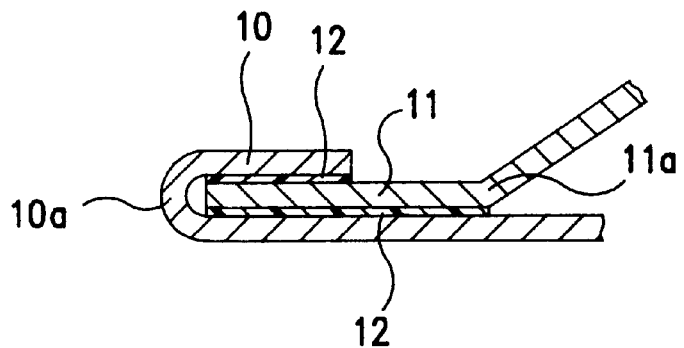
FIG. 8 is also a sectional view of the hemming portion in the assembly process.

The inner panel 11 is doglegged in the vicinity of its one end and is to be bonded to the outer panel 10 by the above-mentioned zinc-epoxy tape 12 so that an end surface of the inner panel 11 outside the bent corner 11a is opposed to the outer panel 10, as shown in FIG. 7. Subsequently, the bent corner 10a of the outer panel 10 is further bent to a 180-degree location such that the inner panel is held between portions of the outer panel 10 at both sides of the bent corner 10a. As a result, upper and lower surfaces of the inner panel 11 are bonded to the outer panel 10 by the previously applied zinc-epoxy tape 12, as shown in FIG. 8. The zinc-epoxy tape 12 is unhardened in this state. However, the tape 12 has such an adhesion that the joint of both panels 10 and 11 is maintained. This state is referred to as "temporary attachment."

The automobile door is assembled with the outer and inner panels 10 and 11 being maintained in the temporary attachment and thereafter accommodated in an electrocoating vessel for the electrodeposition coating. At this stage, the zinc-epoxy tape 12 has a surface zinc content of 23% as shown in FIG. 5. An electrodeposition paint film 13 is formed on the surfaces of the panels 10 and 11. Since the zinc portion has a sufficient conductivity, the film 13 of the same thickness can be formed on the zinc portion in a short period of time as well as on the metal portion.

Figure 9:
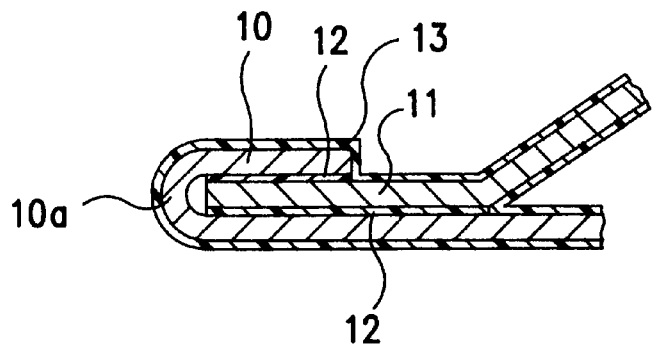
FIG. 9 is a sectional view of the assembled hemming portion.
Figure 10:
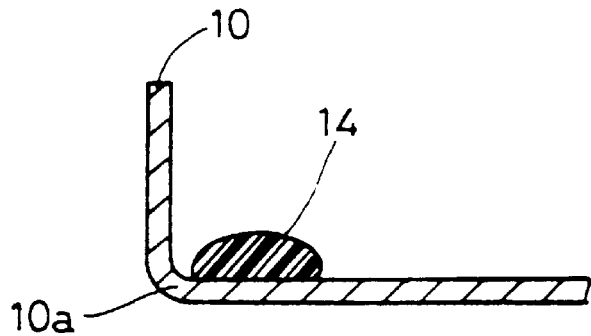
FIG. 10 is a sectional view of the hemming portion in an assembly process, to which portion the corrosion preventive paste of a second embodiment in accordance with the present invention is applied.
Figure 11:
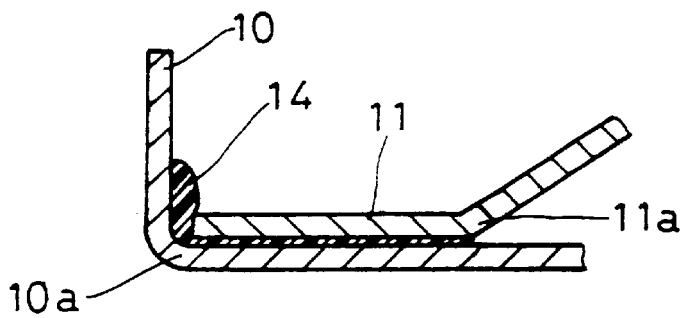
FIG. 11 is also a sectional view of the hemming portion in the assembly process in the second embodiment.
Figure 12:
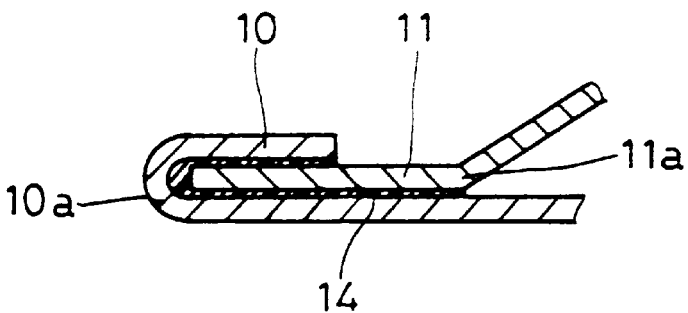
FIG. 12 is also a sectional view of the hemming portion in the assembly process in the second embodiment.
Figure 13:
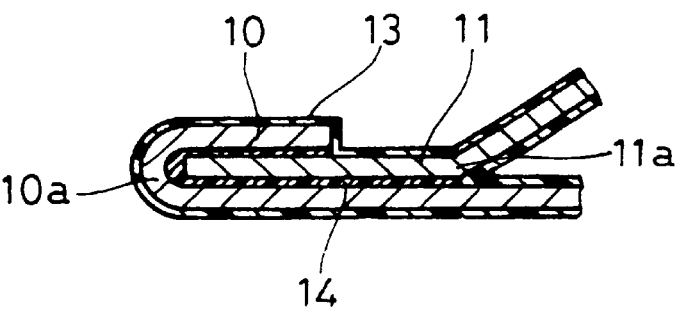
FIG. 13 is a sectional view of the assembled hemming portion in the second embodiment.

Subsequently, the electrodeposition paint film 13 is dried by heating. Since the zinc-epoxy tape 12 is hardened simultaneously with the drying of the paint film 13, a sufficient adhesive strength can be obtained. Furthermore, since the epoxy resin in the vicinity of the tape surface is shrunk to a large degree, sporadically formed paint films come close to each other to thereby cover the entire tape surface, as shown in FIG. 9.

The adhesive corrosion preventive tape of the first embodiment has an adhesive strength even before it is hardened. Accordingly, the tape can be hardened with the electrodeposition paint film and need not be dried by heating immediately after adhesion. Consequently, a separate step for hardening the adhesive corrosion preventive tape can be eliminated. Furthermore, the thickness of the electrodeposited paint film can be rendered the same as that of the other portion, and the whole applied tape can be covered by the electrodeposited paint film after the same has been dried by heating. This means that a corrosion preventive paint applied to the electrodeposited paint film can be formed in the same manner as the metal portion. Accordingly, water cannot easily penetrate. If the water should penetrate, corrosion of steel would not easily progress since the zinc-epoxy tape has a high sacrificial corrosion prevention effect. Additionally, a corrosion preventive seal need not be applied to the boundary between the outer and inner panels 10 and 11.

Second Embodiment

The zinc powder shown as sample L in FIG. 4 is mixed with the thermosetting epoxy resin into an adhesive corrosion preventive paste of a second embodiment. The paste of the second embodiment exhibits the characteristics equal to those of the corrosion preventive tape of the first embodiment, as shown in FIG. 4. The corrosion preventive paste is advantageous in that it can be used for bonding parts having a complex configuration or a small area, to which parts the tape is difficult to be applied. The paste can further be used to fill up a gap or the like. Furthermore, an amount of solvent can be varied in accordance with a bonding manner or faces to be bonded so that the viscosity of the paste is changed. Since the solvent and a softener are evaporated during the hardening of the paste, the same strength and corrosion prevention effect can be obtained from the adhesive corrosion preventive paste as from the adhesive corrosion preventive tape.

FIGS. 10 to 13 illustrate an example in which the corrosion preventive paste 14 of the second embodiment is applied to the hemming portion of the automobile door.

Third Embodiment

In making an adhesive corrosion preventive tape of a third embodiment, the zinc powder shown in TABLE 1A and the zinc powder shown in TABLE 1E are mixed in the ratio of 85:5. The mixture is then dispersed in the epoxy resin so that the whole zinc concentration becomes 90%. Pieces of the adhesive corrosion preventive tape are applied to the joint of the steel panels and one of the panels is bent for the temporary attachment of the other panel in the same manner as in the first embodiment. The electrodeposition coating is applied to the panels and then, the paint film is hardened by heating together with the corrosion preventive tape. As a result, a corrosion preventive current of 6.8 mA/cm$^2$ at the corrosion potential of iron, −770 mV is obtained from the tape of the third embodiment. Thus, the adhesive corrosion preventive tape of the third embodiment provides a satisfactory corrosion prevention effect.

According to the third embodiment, a small amount of zinc powder with a small grain diameter is mixed with the zinc powder with a large grain diameter. Consequently, a higher corrosion prevention effect can be obtained as compared with the case where the zinc powder contains only large grains.

The above-described mixture of zinc powder with small and large grain diameters may be applied to an adhesive corrosion preventive paste.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A corrosion preventive material applied to a surface of a metal product for preventing corrosion of the product in atmosphere, the material consisting essentially of:
    a base material of synthetic resin; and
    65% or more zinc powder by weight dispersed in the base material, wherein said zinc powder contains both larger grains with diameter of 150 μm or more and smaller grains with diameter of less than 150 μm, and the larger grain content of the zinc powder is 25% or more by weight.

2. A corrosion preventive material applied to a surface of a metal product for preventing corrosion of the product in atmosphere, the material consisting essentially of:
    a base material of synthetic resin; and
    45% or more zinc powder by weight dispersed in the base material, wherein said zinc powder contains both larger grains with diameter of 150 μm or more and smaller grains with diameter of less than 150 μm, and the larger grain content of the zinc powder is 90% or more by weight.

3. A corrosion preventive material according to claim 1, wherein the grain diameter of the zinc powder is 350 μm or below and the base material is in the form of a liquid or paste.

4. A corrosion preventive material according to claim 2, wherein the grain diameter of the zinc powder is 350 μm or below and the base material is in the form of a liquid or paste.

5. A corrosion preventive material as specified in claim 1, containing smaller grain zinc powder with diameter ranging between 44 and 74 μm in an amount of 2.91% or more by weight of the material.

6. A corrosion preventive material as specified in claim 2, containing smaller grain zinc powder with diameter ranging between 44 and 74 μm in an amount of 2.91% or more by weight of the material.

7. A corrosion preventive material as specified in claim 3, containing smaller grain zinc powder with diameter ranging between 44 and 74 μm in an amount of 2.91% or more by weight of the material.

8. A corrosion preventive material as specified in claim 4, containing smaller grain zinc powder with diameter ranging between 44 and 74 μm in an amount of 2.91% or more by weight of the material.

9. An adhesive corrosion preventive tape applied to a surface of a metal product for preventing corrosion of the product in atmosphere, the tape comprising:
    an adhesive resin material; and
    65% or more zinc powder by weight dispersed in the adhesive resin material, wherein said zinc powder contains both larger grains with diameter of 150 μm or more and smaller grains with diameter of less than 150 μm, and the larger grain content of the zinc powder is 25% or more by weight.

10. An adhesive corrosion preventive tape applied to a surface of a metal product for preventing corrosion of the product in atmosphere, the tape comprising:
    an adhesive resin material; and
    45% or more zinc powder by weight dispersed in the adhesive resin material, wherein said zinc powder contains both larger grains with diameter of 150 μm or more and smaller grains with diameter of less than 150 μm, and the larger grain content of the zinc powder is 90% or more by weight.

* * * * *